(12) United States Patent
Sawada

(10) Patent No.: US 7,503,584 B2
(45) Date of Patent: Mar. 17, 2009

(54) POSITIONING TYPE STEERING COLUMN DEVICE

(75) Inventor: Naoki Sawada, Maebashi (JP)

(73) Assignee: NSK, Ltd., Tokyo (JP)

( * ) Notice: Subject to any disclaimer, the term of this patent is extended or adjusted under 35 U.S.C. 154(b) by 111 days.

(21) Appl. No.: 10/521,435

(22) PCT Filed: Jul. 1, 2003

(86) PCT No.: PCT/JP03/08378

§ 371 (c)(1),
(2), (4) Date: Sep. 27, 2005

(87) PCT Pub. No.: WO2004/007260

PCT Pub. Date: Jan. 22, 2004

(65) Prior Publication Data

US 2006/0096410 A1    May 11, 2006

(30) Foreign Application Priority Data

Jul. 16, 2002  (JP)  ............................. 2002-206537
May 22, 2003  (JP)  ............................. 2003-144845

(51) Int. Cl.
    *B60D 1/18* (2006.01)
(52) U.S. Cl. ............................. 280/775; 74/492; 74/493
(58) Field of Classification Search ................ 280/775, 280/776, 777; 74/492, 493
    See application file for complete search history.

(56) References Cited

U.S. PATENT DOCUMENTS

| 5,605,351 | A | * | 2/1997 | Higashino | ................ | 280/775 |
| 5,700,032 | A | * | 12/1997 | Fukunaga | ................ | 280/775 |
| 5,845,936 | A | * | 12/1998 | Higashino | ................ | 280/775 |
| 6,467,807 | B2 | * | 10/2002 | Ikeda et al. | ................ | 280/775 |
| 6,688,644 | B2 | * | 2/2004 | Tsunoda et al. | ............ | 280/777 |
| 6,799,779 | B2 | * | 10/2004 | Shibayama | ................ | 280/777 |
| 6,851,331 | B2 | * | 2/2005 | Kuroumaru et al. | ........... | 74/493 |
| 6,990,874 | B2 | * | 1/2006 | Murakami et al. | ............ | 74/493 |
| 2003/0164608 | A1 | * | 9/2003 | Morita et al. | ............... | 280/775 |
| 2005/0242560 | A1 | * | 11/2005 | Inoue | ......................... | 280/775 |
| 2005/0242561 | A1 | * | 11/2005 | Nishioka et al. | ............ | 280/775 |

FOREIGN PATENT DOCUMENTS

EP    0 928 733 A2    7/1999

(Continued)

OTHER PUBLICATIONS

European Search Report dated Mar. 22, 2007 (Three (3) pages).

*Primary Examiner*—Toan C To
(74) *Attorney, Agent, or Firm*—Crowell & Moring LLP

(57) ABSTRACT

A positioning type steering column device, comprising a steering column (1) having a bulged part (19) formed by a hydraulic pressure bulge forming method, the bulged part (19) further comprising a pair of flat surface parts (20) opposed, back to back, to vertical plate parts for tightening of a body mounting bracket, the pair of flat surface parts (20) further comprising projected parts (21) outward-projectedly formed toward the vertical plate parts opposed thereto, whereby even if a warpage occurs on the flat surface parts (20) by punching out when the bulged part (19) is formed by the hydraulic pressure bulge forming method, a steering column tightening holding force can be prevented from lowering.

4 Claims, 12 Drawing Sheets

FOREIGN PATENT DOCUMENTS

| | | |
|---|---|---|
| GB | 2 365 826 A | 2/2002 |
| JP | 59-33043 A | 2/1984 |
| JP | 63-30605 Y2 | 8/1988 |
| JP | 5-8783 A | 1/1993 |
| JP | 8-276852 A | 10/1996 |
| JP | 10-7003 A | 1/1998 |

* cited by examiner (a)     (b)

(c)     (d)

(a)

(b)

POSITIONING TYPE STEERING COLUMN DEVICE

TECHNICAL FIELD

The present invention relates to a positioning type steering column device which prevents a drop in the fastening grip of a steering column caused by tilt or telescopic adjustment operations, even if a flat surface portion of a bulge portion is warped during punch perforation when forming the bulge portion during a bulge forming process.

BACKGROUND ART

Steering columns for vehicles are provided with tilt mechanisms which allow vertical position adjustment of the steering wheel to allow the driver to assume a preferable driving position. For the same purpose, they can be provided with telescopic mechanisms, which allow position adjustment of the steering wheel in forward/backward direction, or tilt-telescopic mechanisms, which allow position adjustment in both vertical and forward/backward direction.

In order to enable tilt rotation of the tilt mechanism around the tilt pivot or telescopic sliding along the steering column axis direction, the steering column is configured so that it can be fastened to vehicle side supporting members in order to maintain the secured state of the steering column in the selected position, while at the same time allowing a relative displacement with respect to the vehicle side supporting members.

In order to perform the relative displacement and securing of the steering column with respect to the vehicle side supporting members, distance brackets, which are provided with, for example, flat side walls, are used as column side supporting members, which are anchored to the cylindrical steering column. Typically, the side walls of these distance brackets are perforated with round holes or long holes, with a shaft rod member passing through the round holes in the tilt mechanism and through the long holes in the telescopic mechanism, enabling tilt rotation around the tilt pivot or telescopic sliding along the axis of the steering column. The steering column and the distance brackets are members which are manufactured separately, and are generally anchored to each other by welding.

Now, a novel steering column has been proposed, which does not use these distance brackets anchored by welding. Instead, a portion of the tubular material is replaced by a bulge portion that is bulged out therefrom, which can be manufactured using a hydraulic bulging method. Among the steering columns of this type, a steering column is known, in which, as shown in FIG. 11, for example one portion of the steering column 51 is bulged out to form a bulge portion 52.

The bulge portion 52 is provided with a pair of back-to-back flat surface portions 53, which directly abut against the vehicle side supporting members (not shown in the drawings). These flat surface portions 53 are perforated by round holes 54 in order to pass the shaft rod member through. With this steering column 51 in which the bulge portion 52 is formed, it is possible for example to omit some of the parts constituting the tilt mechanism, which has the advantage that is allows a reduction of manufacturing costs for the steering device, for example.

The following prior art document is related to the invention of the present application:

Japanese Laid-Open Patent Publication, JP H8-276852A (page 3, FIG. 3)

However, when manufacturing using a hydraulic bulging method, a pressure force accompanying the punch perforations acts on the flat surface portions 53, particularly when perforating the round holes 54, causing a certain amount of deviation around the hole portions in the flat surface portions 53, which may prevent the flat surface portions 53 from being finished to flat surfaces. In other words, with the hydraulic bulging method, instead of countering the cutting load with a die as during the punching process in a press method, the goal is to counter that load with pressure oil O, which is a non-rigid body in contact with a workpiece W opposite the applied pressure of a punch P, as shown in FIG. 12. In this case, while there are no problems with the perforations themselves, the flat surfaces 53 warp around the perforated portions, resulting in, the flat portions 53 not being finished as flat surfaces.

The warping which arises on the flat portions 53 creates, an error equal to $\Delta D$ with respect to a reference plane I, as shown in FIG. 13 for example. If this warping on the flat surface portions 53 becomes large, the contact surfaces become unstable during tilt or telescopic adjustment operations, preventing the intended fastening power from being achieved and the steering column from being held securely.

An object of the present invention is to provide a positioning type steering column device which can prevent a drop in the fastening grip of the steering column, even if warping arises during punched perforation when forming a bulge portion of the steering column using a hydraulic bulging method.

DISCLOSURE OF INVENTION

In a preferred embodiment of the present invention, a positioning type steering column device comprises a vehicle body mounting bracket comprising a pair of vertical plate portions; a cylindrical steering column comprising a bulge portion gripped by the pair of vertical plate portions of the bracket; a steering shaft rotatably provided inside the steering column; a shaft rod member provided passing through the bulge portion of the steering column and the pair of vertical plate portions of the bracket; and a fastening mechanism, which is provided on the shaft rod member and which secures the steering column by adjusting a distance between the opposing pair of vertical plate portions; wherein the bulge portion comprises a pair of flat surface portions formed in opposition to the pair of vertical plate portions of the bracket, projection portions formed protruding from the pair of flat surface portions toward the opposing vertical plate portions, and through holes perforated into the projection portions.

The projection portions formed in the bulge portion of the present invention protrude outwardly from the flat surface portions away from the steering column. These projection portions are protruded in accordance with the machining error arising on the flat surface portions at the punch perforation, and can cancel out any warping of the flat surface portions during perforation.

As a result, for example during a tilt or telescopic adjustment operation, in the event that, for example, a cam mechanism is used to tighten, then the tightening vertical plate portions of the vehicle body mounting bracket and the projection portions of the flat surface portions come in contact over the entire area around the shaft rod member, providing a stable reaction force, therefore making it possible to securely hold the steering column.

According to the present invention, it is preferable that the projection portions protrude in outward direction from the flat surface portions by a specified value.

Further, according to the present invention, it is preferable that a span of the flat surface portions of the bulge portion is equal to or larger than an outer diameter of the steering column.

BEST MODE FOR CARRYING OUT THE INVENTION

Figure 1:
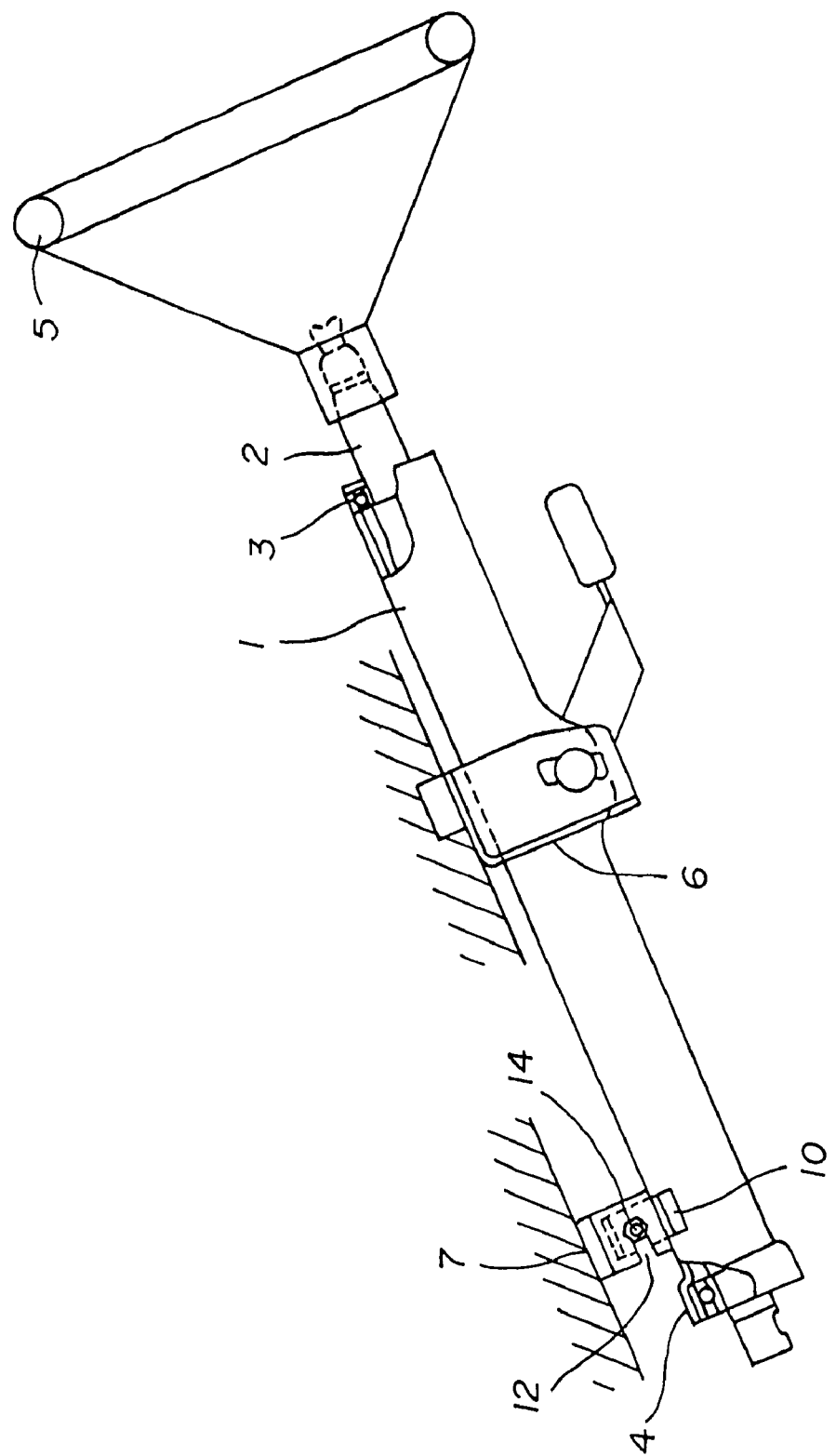
FIG. 1 is a lateral view showing one embodiment of the steering column device according to the present invention.

The following is a detailed description of an embodiment of a steering column device of the present invention, with reference to the accompanying drawings. As shown in FIG. 1, the steering column device according to the present invention is provided with a steering column 1 and a steering shaft 2 positioned inside the steering column 1. This steering column 1 is, for example, made of a tubular soft-steel material, and is provided with a bulge portion using a hydraulic bulging method. The steering shaft 2 is rotatably supported within the steering column 1 by shaft bearings 3 and 4, which are positioned at the ends of the steering column 1. A steering wheel 5 which applies a steering force to one end of the steering shaft 2 is attached to steering shaft 2.

On the other hand, the middle portion of the steering column 1 is held by an upper vehicle body mounting bracket 6, while the end opposite the steering wheel 5 is supported by a lower vehicle body mounting bracket 7.

Figure 2:
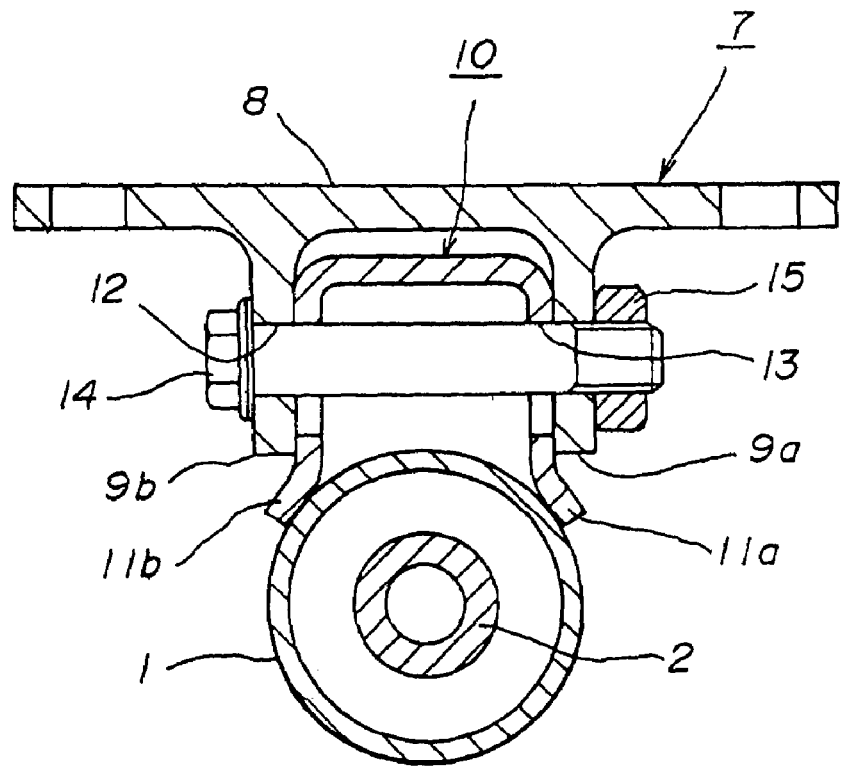
FIG. 2 is a cross-sectional view showing the tilt adjustment pivot shown in FIG. 1 in detail.

As shown in FIG. 2, the lower vehicle body mounting bracket 7 comprises a vehicle body mounting plate portion 8, which is attached by a fastening member to the vehicle body, and vertical plate portions 9a and 9b which form a single unit with the vehicle body mounting plate portion 8 and extend vertically downward as a pair of left and right plate portions. On the column side, a lower column mounting bracket 10 is attached by being welded onto the steering column 1. The lower column mounting bracket 10 has a shape like three sides of a square in cross-section and is wedged between the pair of left and right vertical plate portions 9a and 9b of the lower vehicle body mounting bracket 7 and has a pair of left and right plate portions 11a and 11b opposite the vertical plate portions 9a and 9b of the lower vehicle body mounting bracket 7.

The pair of left and right vertical plate portions 9a and 9b of the lower vehicle body mounting bracket 7 are provided with through-holes 12 (see FIG. 1) which open forward, and the pair of left and right plate portions 11a and 11b on the lower column mounting bracket 10 are provided with circular through-holes 13. A tilt bolt 14 is provided which passes through the through-holes 12 and 13 and is secured by screwing together with a nut 15. This tilt bolt 14 separates from the open through-holes 12 by moving toward the front side of the vehicle body when a load is applied from the steering wheel 5. Further, this functions as a tilt pivot for the steering column 1, rotating with the tilt pin as a center when the tilt position of the steering column 1 is adjusted.

Figure 3:
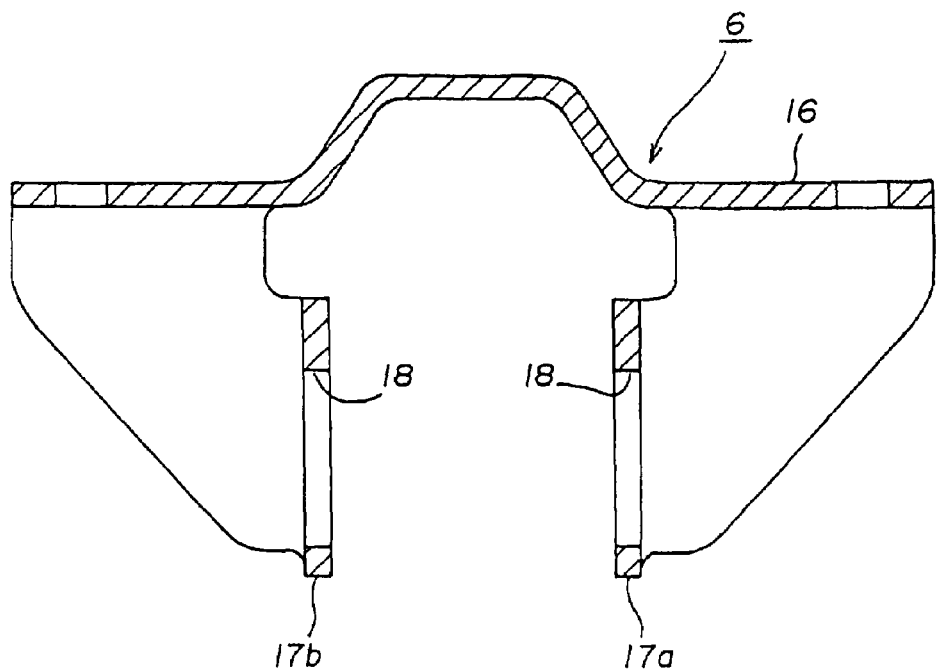
FIG. 3 is a cross-sectional view showing the upper vehicle body mounting bracket shown in FIG. 1.

As shown in FIG. 3, the upper vehicle body mounting bracket 6 is provided with a vehicle body mounting plate portion 16, which is attached to the vehicle body, and a pair of left and right tightening vertical plate portions 17a and 17b. These tightening vertical plate portions 17a and 17b are both linked to vehicle body mounting plate portion 16 and extend vertically up and down, gripping the steering column 1 between the opposing vertical plate portions 17a and 17b. Arc-shaped grooves 18 are formed in both vertical plate portions 17a and 17b, such that the steering wheel 1 can be pivoted up and down by a tilt adjustment operation.

A removable member (for example, a capsule, a coating plate), which is not shown in the drawings, is provided between the vehicle mounting portion of the upper vehicle body mounting bracket 6 and the vehicle body. This member makes it possible for the vehicle mounting bracket 6 to slide forward and move away from the vehicle body together with the separation of the tilt bolt 14 described above, when excessive load is applied from the steering wheel.

Figure 4:
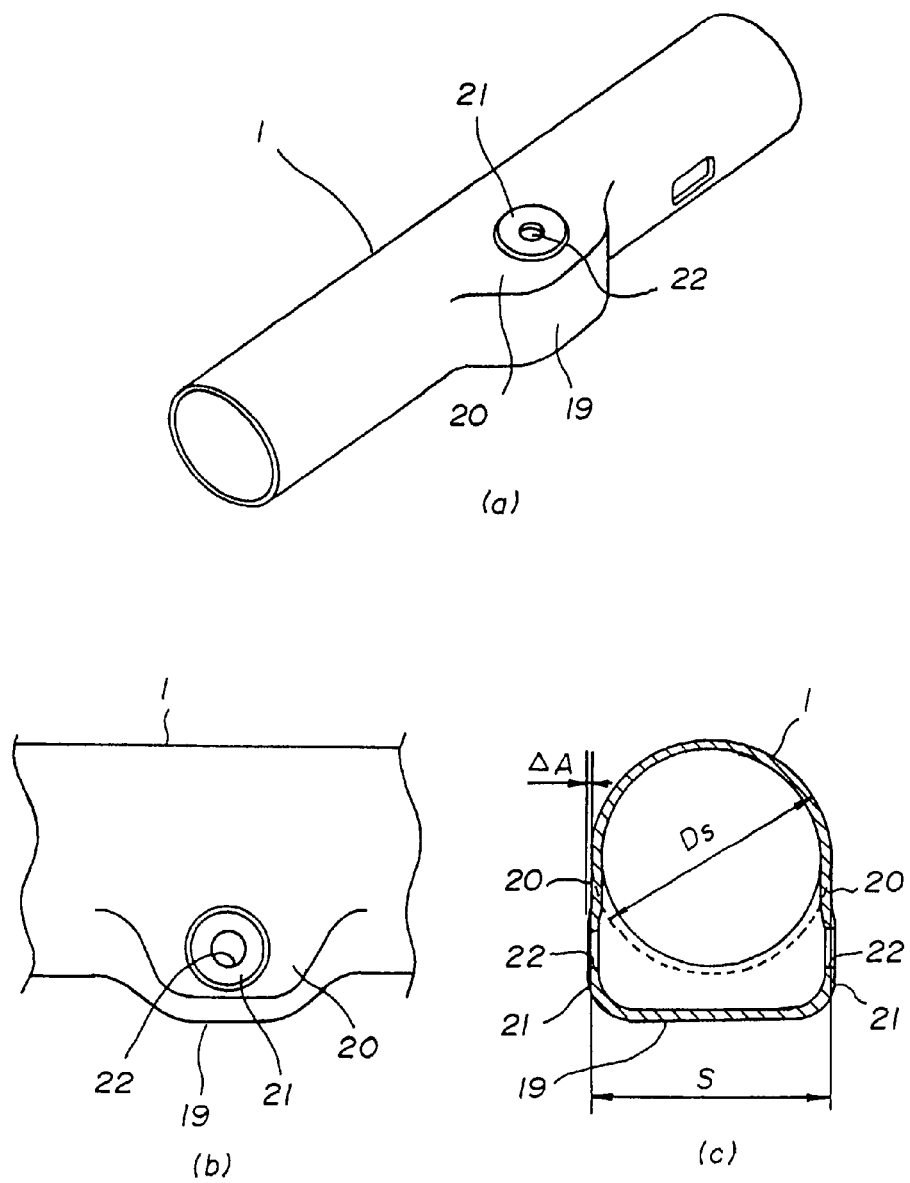
FIG. 4 shows the main part of the steering column shown in FIG. 1, with (a) being a perspective view of the steering column, (b) a lateral view of the steering column, and (c) a cross-sectional view of the steering column.

As shown in FIG. 4(a), a bulge portion 19 on the steering column 1 which is gripped between the vertical plate portions 17a and 17b of the upper vehicle body mounting bracket 6 is formed approximately at the lengthwise center. As shown in FIG. 4(b) and FIG. 4(c), this bulge portion 19 comprises a pair of back-to-back flat surface portions 20. This pair of flat surface portions 20 is configured such that their span S is equal to or larger than a steering column diameter $D_s$. This pair of back-to-back flat surface portions 20 comprises circular projection portions 21 which project outward (toward the vertical plate portions) from the steering column 1. The pair of projection portions 21 is pierced by round holes 22 which allow a shaft rod member to pass through. The round holes 22 are pierced by punching inward from the outside of the steering column 1 during the hydraulic bulging process. The projection portions 21 formed on the flat surface portions 20 project out from the steering column 1 by a distance ΔA.

Figure 5:
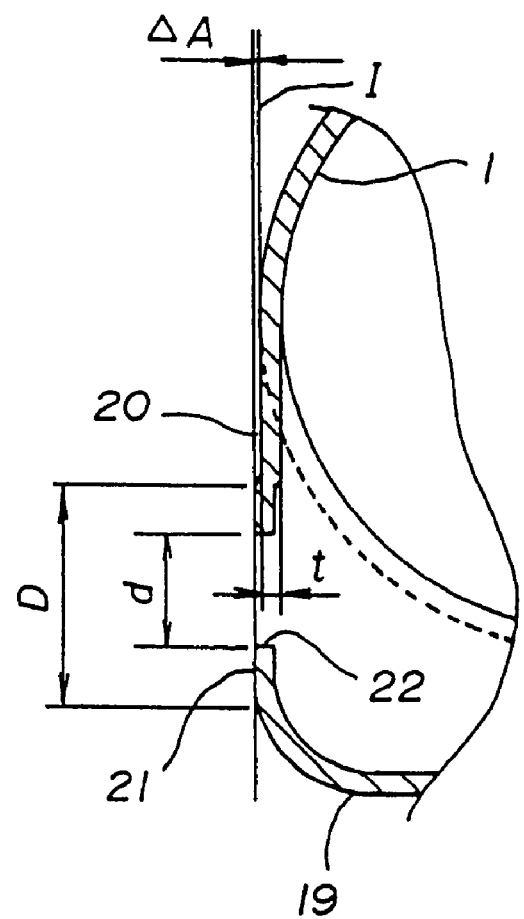
FIG. 5 is a partial cross-sectional view of the steering column shown in FIG. 4.

As shown in FIG. 5, the projection portions 21 project outward for a distance of ΔA from the steering column 1 in relation to a reference plane I, which coincides with the flat surface portions 20. According to testing results regarding ΔA, when the wall thickness t of the tubular material is 1.6 to 2.3 mm, the value of ΔA is preferably within the range from 0.5 to 2.0 mm. More preferable still is that the value be within the range from 0.8 to 1.6 mm. Furthermore, testing provided the following preferable values regarding the size of the projection portions 21. The diameter D of the flat surface portions 20 is preferably within the range of 12 to 30 mm, while the diameter d of the round holes 22 is preferably within the range of 6 to 10 mm, judging from the testing results.

Figure 6:
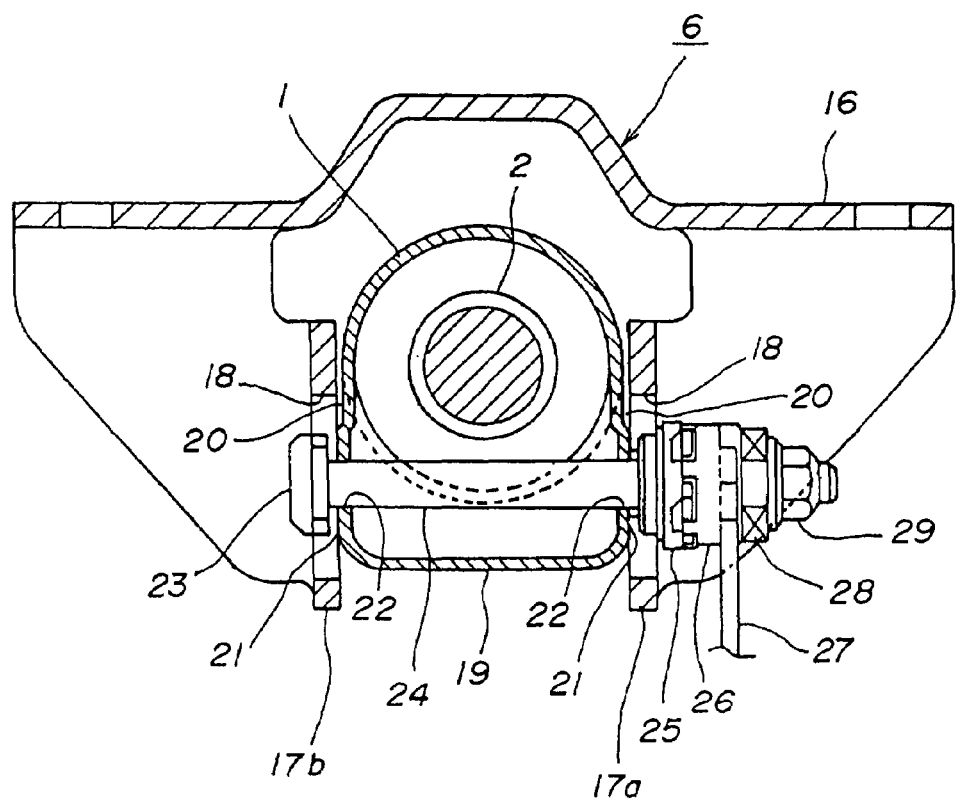
FIG. 6 is cross-sectional view of the column tightening mechanism used in the steering column device according to the present invention.

Referring to FIG. 6, the following is a description of the column mounting mechanism which secures the tilt adjustment position. The shaft rod member 24, which is provided with a head portion 23, passes through the arc-shaped groove 18 in the vertical plate portion 17a of the upper vehicle body mounting bracket 6, the round holes 22 in the pair of flat surface portions 20 of the steering column 1, and the arc-shaped groove 18 in vertical plate portion 17b. The area of the head portion 23 of the shaft rod member 24 that is in contact with the vertical plate portion 17b has a substantially rectangular cross-section and engages the groove 18, thus preventing rotation.

On the other side, a fixed cam member 25, a movable cam member 26, a lever 27, and a thrust bearing 28 are provided at the front end of the shaft rod member 24 which projects out from the vertical plate portion 17a, and are further secured to that front end by being tightened by a nut member 29 which is screwed onto a threaded portion formed on the shaft rod member 24. The surface of the fixed cam member 25 that is in contact with the vertical plate portion 17a has a substantially rectangular cross-section and engages the groove 18, thus preventing rotation. The movable cam member 26 and the lever 27 are joined together such that they cannot rotate in relation to each other, and operation of the lever 27 is coupled to rotation of the movable cam member 26.

The fixed cam member 25 and the movable cam member 26 are each provided with cam lobes on the surface opposite the other cam member, such that when the cams rotate in relation to each other, the distance between the shafts of the fixed cam member 25 and the movable cam member 26 changes. When the position of the steering column is adjusted, rotating the lever 27 in one direction causes the movable cam member 26 to rotate, thereby reducing the distance in axial direction between the fixed cam member 25 and the movable cam member 26, while at the same time causing the tightening of the steering column 1 to become disengaged due to the increase in the distance between the vertical plate portions 17a and 17b, thus making the steering column 1 freely adjustable with regard to position.

When the positioning adjustment of the steering column 1 is complete and the position of the steering column is to be secured, the lever 27 is rotated in the opposite direction. When this happens, the movable cam member 26 rotates in conjunction with the rotation of the lever 27, causing the distance in axial direction between the fixed cam member 25 and the movable cam member 26 to increase. This reduces the distance between the vertical plate portions 17a and 17b, causing the position of the steering column 1 to be secured by the tightening of the bulge portion 19 of the steering column 1.

In this embodiment, when a tilt adjustment operation is made to the above configuration, the vertical plate portions 17a and 17b of the vehicle mounting bracket 6 are first in contact with the projection portion 21, and the vertical plate portions 17a and 17b are displaced toward the center of the steering column, while the vertical plate portions 17a and 17b are effectively in flush contact with the projection portions 21, around the shaft rod member 24, so that the steering column 1 is held securely.

Figure 7:
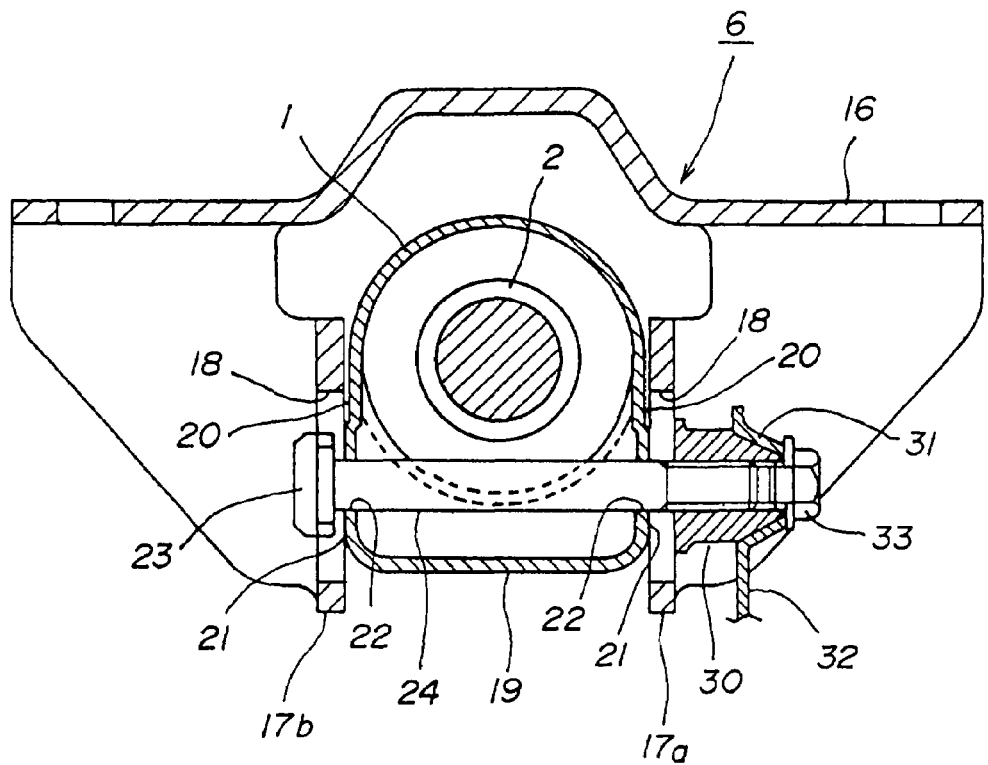
FIG. 7 is a cross-sectional view showing another embodiment of the column tightening mechanism according to the present invention.

The following is a description of an embodiment of the present invention different from the above description. As shown in FIG. 7, this embodiment comprises a different column tightening mechanism. This column tightening mechanism has the following configuration. The shaft rod member 24, which is provided with the head portion 23, passes through the arc-shaped groove 18 in the vertical plate portion 17a of the upper vehicle mounting bracket 6, the round holes 22 in the pair of flat surface portions 20 of the steering column 1, and the arc-shaped groove 18 in the vertical plate portion 17b. The area of the head portion 23 of the shaft rod member 24 that contacts the vertical plate portion 17b has a substantially rectangular cross-section and engages the groove 18, thus preventing rotation.

On the other side, the front end of the shaft rod member 24 which projects from the vertical plate portion 17a is provided with a male thread. The surface on one side of a nut member 30 which is screwed onto the male thread contacts the vertical plate portion 17a while the surface on the other side forms a tapered surface 31. The front end of a lever 32 is also provided with a tapered surface in order to mate with the tapered surface 31 of the nut member 30. The nut member 30 is formed with a female thread passing through it. As described above, one side of the female thread in the nut member 30 is screwed together with the shaft rod member 24, while the other side of the female thread is screwed together with a securing bolt 33. The tightening of this securing bolt 33 secures the tapered surfaces of the nut member 30 and the lever 32 such that they cannot rotate in relation to each other.

When the position of the steering column is to be adjusted, rotating the lever 32 in one direction causes the nut member 30 to rotate in the same direction, which causes the distance between the vertical plate portions 17a and 17b to increase. This causes the tightening of the steering column 1 to disengage, enabling the steering column 1 to be freely adjustable with regard to position.

When the positioning adjustment of the steering column 1 is complete and the position of the steering column is to be secured, the lever 32 is rotated in the opposite direction. When this happens, the nut member 30 rotates in conjunction with the rotation of the lever 32, reducing the distance between the vertical plate portions 17a and 17b, and causing the position of the steering column 1 to be secured by the tightening of the bulge portion 19 of the steering column 1.

In this embodiment, as in the embodiment described previously, when a tilt adjustment operation is made, the vertical plate portions 17a and 17b of the vehicle mounting bracket 6 are first in contact with the projection portion 21, and the vertical plate portions 17a and 17b are displaced toward the center of the steering column, while the vertical plate portions 17a and 17b are effectively in flush contact with the projection portions 21 around the shaft rod member 24, so that the steering column 1 is held securely.

Figure 8:
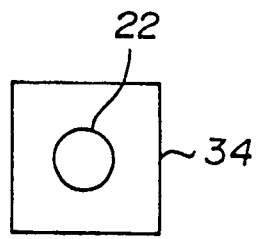
FIG. 8 shows the projection portions formed in the bulge portion of the steering column according the present invention, with (a), (b), (c), and (d) being plane views of different modification examples.
Figure 8:
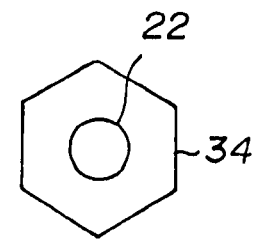
Figure 8:
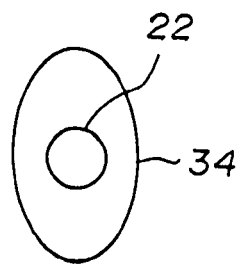
Figure 8:
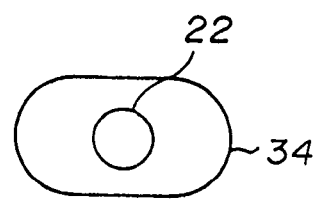

Moreover, in each of the above embodiments, it is possible to replace the circular projection portions 21 formed on the flat surface portion 20 with polygonal projection portions 34 with four, six, or more sides as shown in FIG. 8(*a*) and FIG. 8(*b*), with elliptical projection portions 34 as shown in FIG. 8(*c*), or with oval projection portions 34 as shown in FIG. 8(*d*).

Figure 9:
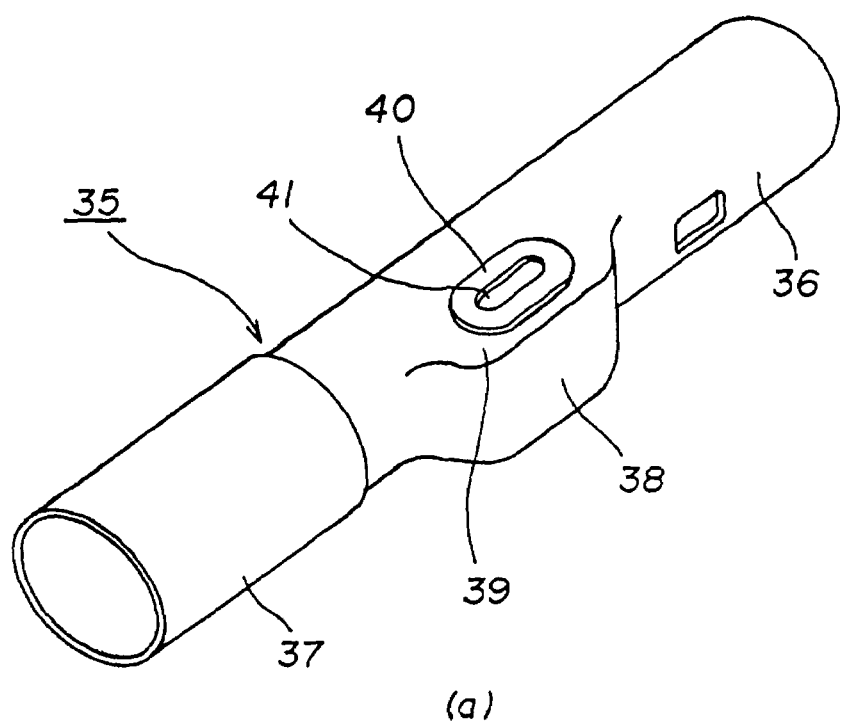
FIG. 9 shows the main part of the steering column according to another embodiment of the present invention, with (a) being a perspective view of the steering column and (b) a cross-sectional view of the steering column.
Figure 9:
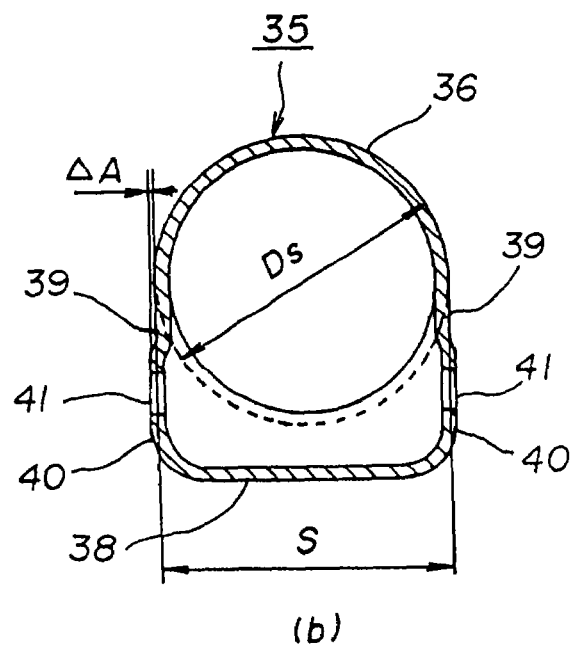

The following is a description of an embodiment of the present invention different from the above. The configuration is approximately the same as the first embodiment described above. Also the configuration of the lower side of the outer tube is the same as in the first embodiment. As shown in FIG. 9(*a*), a steering column 35 of this embodiment, which is applied to a telescopic steering column device, comprises an inner tube 36 and an outer tube 37. This inner tube 36 is inserted into the outer tube 37 such that it freely slides in the axial direction of the steering column. The inner tube 36 and the outer tube 37 are made from tubular soft-steel material.

In this steering column 35, the inner tube 36 is provided with a bulge portion 38, which is gripped between the pair of vertical plate portions of the upper vehicle mounting bracket. As shown in FIG. 9(a) and FIG. 9(b), this bulge portion 38 comprises a pair of back-to-back flat surface portions 39. This pair of back-to-back flat surface portions 39 is configured such that their span S is equal to or larger than a steering column diameter $D_s$. The pair of flat surface portions 39 is each provided with oval projection portions 40 which project outward (in the direction of the vertical plate portions) from the steering column 35. The pair of projection portions 40 is pierced by long holes 41 for passing the shaft rod member through. The long holes 41 are pierced by punching inward from the outside of the steering column 35 during the hydraulic bulging process. The projection portions 40 formed on the flat surface portions 39 project outward by a distance ΔA from the steering column 35.

Figure 10:
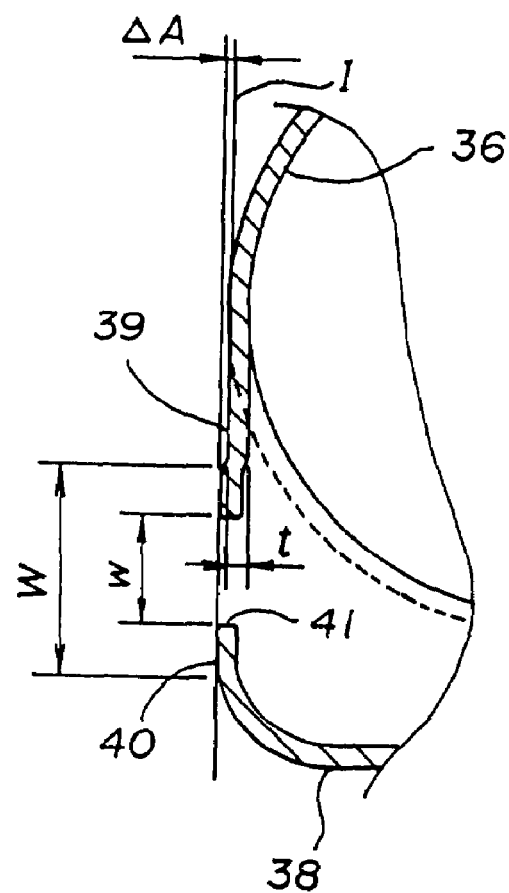
FIG. 10 is a partial cross-sectional view of the steering column shown in FIG. 9.
Figure 11:
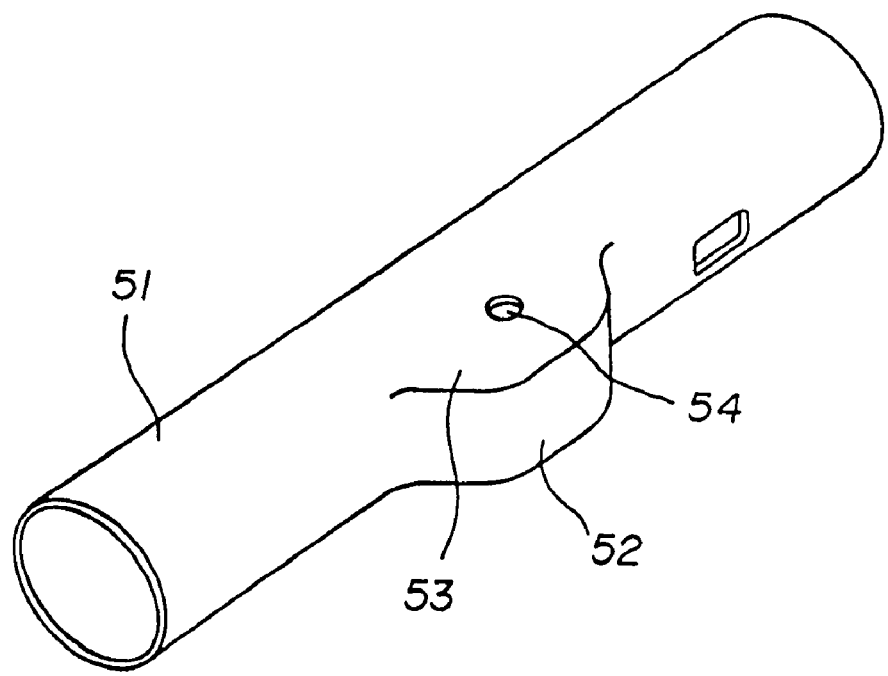
FIG. 11 is a perspective view of the steering column comprising a conventional bulge portion.
Figure 12:
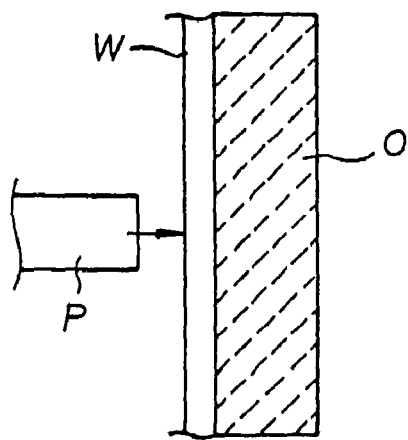
FIG. 12 is a diagrammatic view showing a punch perforation method using a typical hydraulic bulging method.
Figure 13:
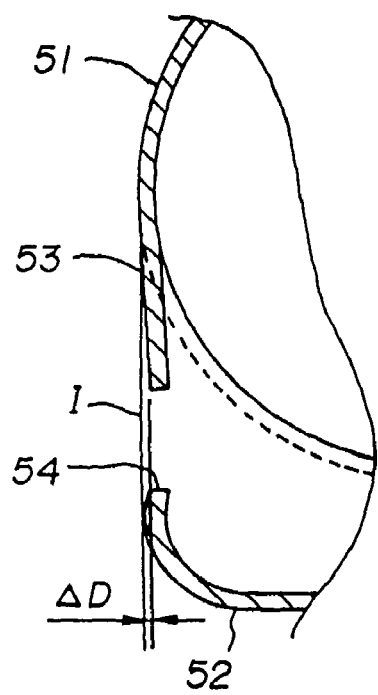
FIG. 13 is a partial cross-sectional view of a steering column, showing the warping of the flat surface portions created by the punch perforation method using conventional technology.

As shown in FIG. 10, the projection portions 40 project outward for a distance ΔA from the steering column 35 in relation to reference plane I which coincides with the flat surface portions 39. According to testing results regarding ΔA, when the wall thickness t of the tubular material is 1.6 to 2.3 mm, the value of ΔA is preferably within the range from 0.5 to 2.0 mm. More preferable still is that the value be within the range from 0.8 to 1.6 mm. At the same time, testing provided the following preferable values regarding the size of the projection portions 40. The width W of the flat surface portions 39 is preferably within the range of 12 to 30 mm, while the width w of the long holes 41 is preferably within the range of 6 to 10 mm.

In this embodiment, when, for example, the cam mechanism is cinched in a telescopic or a tilt-telescopic adjustment operation, the vertical plate portions of the bracket are first in contact with the projection portion 40, and the vertical plate portions are displaced toward the center of the steering column, while the vertical plate portions and the projection portion 40 around the shaft rod member are effectively in flush contact, so that the steering column 1 can be held securely.

Moreover, for the joining of the two tubes, instead of positioning the inner tube on the upper side and the outer tube on the lower side, it is also possible to reverse this arrangement.

Further, the method for forming the bulge portion of the steering column described above is not limited to a hydraulic bulging method, and an explosive bulging method or a rubber bulging method may be used. A pressing method may also be used instead of a bulging method.

Further, an aluminum alloy material may be used instead of a soft-steel material for the steering column.

INDUSTRIAL APPLICABILITY

The steering column according to the present invention is useful for a vehicle steering device, and is particularly suitable for preventing a drop in the fastening grip of the steering column even if the flat surface portions warp during punch perforation, because it can compensate for that as it is provided with projection portions on the projection portions of the steering column which project outwardly from the flat surface portions.

The invention claimed is:

1. A steering column positioning device, comprising:
  a vehicle body mounting bracket comprising a pair of vertical plate portions;
  a cylindrical steering column comprising a bulge portion gripped by the pair of vertical plate portions of the bracket;
  a rotatable steering shaft inside the steering column;
  a shaft rod member passing through the bulge portion of the steering column and the pair of vertical plate portions of the bracket; and
  a fastening mechanism, on the shaft rod member and which secures the steering column by adjusting a distance between the opposing pair of vertical plate portions;
  wherein the bulge portion comprises a pair of flat surface portions formed in opposition to the pair of vertical plate portions of the bracket, projection portions protruding from the pair of flat surface portions toward the opposing vertical plate portions, and elongated holes perforated into the projection portions for allowing telescopic adjustment.

2. The steering column positioning device according to claim 1, wherein the projection portions protrude outwardly from the flat surface portions.

3. The steering column positioning device according to claim 1, wherein a span of the flat surface portions of the bulge portion is equal to or larger than an outer diameter of the steering column.

4. The steering column positioning device according to claim 2, wherein a span of the flat surface portions of the bulge portion is equal to or larger than an outer diameter of the steering column.

\* \* \* \* \*